United States Patent
Coste (10) Patent No.: US 7,050,111 B2
(45) Date of Patent: May 23, 2006

(54) PROCESS AND DEVICE FOR SYNCHRONIZING A REFERENCE SIGNAL WITH RESPECT TO A VIDEO SIGNAL

(75) Inventor: Diego Coste, Varces (FR)

(73) Assignee: STMicroelectronics SA, Montrouge (FR)

( * ) Notice: Subject to any disclaimer, the term of this patent is extended or adjusted under 35 U.S.C. 154(b) by 503 days.

(21) Appl. No.: 10/280,737

(22) Filed: Oct. 25, 2002

(65) Prior Publication Data

US 2003/0081149 A1 May 1, 2003

(51) Int. Cl.
*H04N 5/10* (2006.01)

(52) U.S. Cl. .................. 348/531; 348/512; 348/540

(58) Field of Classification Search ............... 348/531, 348/512, 516, 537, 540, 194; 327/156; 331/20
See application file for complete search history.

(56) References Cited

U.S. PATENT DOCUMENTS

| | | | | |
|---|---|---|---|---|
| 4,203,076 A | * | 5/1980 | Yamashita | 331/25 |
| 4,467,359 A | * | 8/1984 | Hosoya | 348/541 |
| 4,792,852 A | * | 12/1988 | Narusawa | 348/530 |
| 5,126,639 A | * | 6/1992 | Srivastava | 315/364 |
| 5,184,091 A | * | 2/1993 | Srivastava | 331/10 |
| 5,485,220 A | * | 1/1996 | McNeilly et al. | 348/525 |
| 5,608,462 A | | 3/1997 | Maas et al. | 348/531 |
| 5,731,843 A | * | 3/1998 | Cappels, Sr. | 348/537 |
| 5,844,622 A | * | 12/1998 | Hulvey | 348/546 |
| 5,877,640 A | | 3/1999 | Geerlings | 327/141 |
| 6,028,642 A | * | 2/2000 | Rinaldi et al. | 348/540 |
| 6,229,401 B1 | * | 5/2001 | Wilber | 331/20 |
| 6,392,642 B1 | * | 5/2002 | Wu | 345/213 |
| 6,833,875 B1 | * | 12/2004 | Yang et al. | 348/665 |

FOREIGN PATENT DOCUMENTS

FR     2685584     6/1993

OTHER PUBLICATIONS

Patent Abstracts of Japan, vol. 013, No. 005, Jan. 9, 1989 & JP63215170A, Seiko Epson Corp, Sep. 7, 1998.

* cited by examiner

*Primary Examiner*—Victor R. Kostak
(74) *Attorney, Agent, or Firm*—Lisa K. Jorgenson; Allen, Dyer, Doppelt, Milbrath & Gilchrist, P.A.

(57) ABSTRACT

A synchronization process may include detecting successive horizontal synchronization pulses of a video signal, and a phase comparison between the successive detected pulses and the successive transitions of the reference signal for controlling the oscillator of the phase-locked loop. The detection of each horizontal synchronization pulse may include sampling the video signal, low-pass filtering the sampled signal, thresholding the filtered signal for leaving pulses having a level below a threshold. The synchronization process may also include selecting, as a function of predetermined selection criteria, from among the residual pulses within an observation window centered on a transition of the reference signal for the one which corresponds to the horizontal synchronization pulse.

34 Claims, 4 Drawing Sheets

PROCESS AND DEVICE FOR SYNCHRONIZING A REFERENCE SIGNAL WITH RESPECT TO A VIDEO SIGNAL

FIELD OF THE INVENTION

The present invention relates to the processing of video signals, and more particularly, to frequency synchronization and phase synchronization with respect to a video signal.

BACKGROUND OF THE INVENTION

One of the first tasks of a video circuit receiving a conventional analog video signal is to synchronize itself with respect to the frequency and the phase of the video signal. This synchronization task is performed by a phase-locked loop.

A phase-locked loop conventionally comprises a controllable oscillator delivering the reference signal (which will synchronize itself with the video signal) and a phase comparator whose role is to extract the position of the horizontal synchronization pulses from the video signal and to translate this position into the form of an error signal. The error signal provides the phase gap between the video signal and the reference signal. After passing through the loop filter, the error signal controls the oscillator so that the latter shifts in frequency for ensuring synchronization of the reference signal with respect to the video signal. In this instance, it is with respect to the horizontal synchronization pulses of the video signal.

Recognition of the horizontal synchronization pulses is made difficult by the very large diversity of signal properties which have to be supported. Thus, the signal/noise ratio of these signals can vary from more than 50 db in the best cases to around 0 db, or even less, for the worst cases in which the phase-locked loop has to operate. The approaches generally used to extract synchronization are based essentially on analog processes utilizing multipliers and integrators.

SUMMARY OF THE INVENTION

In view of the foregoing background, an object of the present invention is to provide an approach for obtaining synchronization with respect to a video signal, and in particular, for detecting the horizontal synchronization pulses.

This and other objects, advantages and features in accordance with the present invention are provided by a process for synchronizing a reference signal emanating from an oscillator of a phase-locked loop with respect to a video signal. The process preferably comprises a detection of the successive horizontal synchronization pulses of the video signal, and a phase comparison between the successively detected pulses and the successive transitions of the reference signal for controlling the oscillator.

According to a general characteristic of the invention, the detection of each horizontal pulse comprises a sampling of the video signal, a low-pass filtering of the sampled signal, and thresholding the filtered signal for leaving only pulses whose level is below a threshold. The threshold may be predetermined, such as 50% of the measured mean level of a horizontal synchronization pulse, for example. The threshold may be programmable, and is selected as a function of predetermined selection criteria from among the residual pulses with an observation window centered on a transition of the reference signal, e.g., one that corresponds to the horizontal synchronization pulse.

Stated otherwise, the present invention analyzes all the pulses generated after thresholding and ranks them according to their level of likelihood. The pulse having the maximum likelihood is then selected to update the control of the oscillator of the loop. Several selection criteria may be used. The selection criteria may comprise, for example, dimension criteria with respect to a mean dimension (mean width) of a horizontal synchronization pulse.

Thus, it is possible to eliminate all the residual pulses whose width is below a predetermined percentage of the mean width of a horizontal synchronization pulse. Once this elimination has been performed, it is then possible to select the residual pulse having a width that most closely approximates the mean width, for example.

The selection criteria may comprise position criteria with respect to the expected position of the horizontal synchronization pulse. More precisely, in this case, the expected position of the horizontal synchronization pulse is that of the transition of the reference signal. The time gap between each residual pulse and the transition of the reference signal is determined, and the one which has the smallest time gap is selected. The selection criteria may combine the two criteria mentioned above, that is, the position criteria and the dimensioning criteria.

Thus, according to one mode of implementation of the invention, all the residual pulses having a width below a predetermined percentage of the mean width of a horizontal synchronization pulse are eliminated, and each non-eliminated residual pulse is assigned a first score as a function of its width. The highest first score corresponds, for example, to a pulse whose width is equal to the mean width.

Furthermore, the time gap between each non-eliminated residual pulse and the transition of the reference signal is determined. A second score is then assigned to each non-eliminated residual pulse. The highest second score corresponds, for example, to a pulse having a zero time gap. Each non-eliminated residual pulse is then assigned a final score resulting from a predetermined weighting between the first score and the second score. The residual pulse having the highest final score is then selected.

The weighting can alter as a function of the applications so as to adapt, in particular, to the various types of video sources and also to the quality of this video signal. Thus, in the presence of high noise, the position criteria will be favored over the dimension criteria. Whereas in the presence of low noise, the dimension criteria will be favored over the positioning criteria. Likewise, when the video source is a video recorder, for example, this very probably leads to an end-of-frame phase jump at the time the width of the synchronization pulses will be favored over their position.

Other selection criteria may also be used. Mention may thus be made, by way of a nonlimiting example, of the following:

Criteria based on evaluating the energy of all the pulses of the line by simple integration for giving a better score to the pulse lying in the zone of greatest energy (such criteria is particularly beneficial for very noisy signals prompting a large number of pulses having a highly variable width);

In addition to evaluating the position of the pulses with respect to the phase of the phase-locked loop (transition of the reference signal), this position can be evaluated with respect to the pulse of the previous line, thereby making it possible to tag a lasting phase change;

When the source is a video recorder, the mean phase jump can be evaluated, and around the zone of a probable phase jump the scores of the shifted pulses of this phase will then be boosted;

It is also possible to evaluate the proportions to which the threshold in the thresholding phase has been overshot, and the scores of the pulses exhibiting large threshold overshoots will then be boosted; and It is also possible to evaluate the slope of the filtered signal during thresholding thereof, and to increase the scores of the pulses resembling the mean.

The length of the observation window is, for example, on the order of ⅔ of the length of a video line. The length of the observation window may be variable, such as a function of the noise level, for example.

In order to take into account any synchronization pulses which might lie outside this observation window, it is advantageous for the detection of each horizontal synchronization pulse to also comprise a detection that is a function of the predetermined selection criteria. The selection criteria is from among the residual pulses situated outside the observation window, that is, one which corresponds to a horizontal synchronization pulse. Also, if this detection is positive, then at the start of the observation window, the phase error controlling the oscillator is initialized to a very high value so that if no pulse is selected in the course of the observation window, this very large phase error will lead to a very large phase shifting of the phase-locked loop.

Stated otherwise, according to this mode of implementation, a monitoring is performed during the blind zone (a zone situated outside the observation window) and a search is made for all the masked residual pulses which may resemble true horizontal synchronization pulses. This resemblance may, for example, be evaluated simply by the width of the pulses. If there has been a hidden pulse, then the phase gap is initialized to a very large value. This phase error is of course updated during the observation window. However, if during this window there is no pulse selected, the oscillator will be controlled with this large phase error, thereby inducing the phase-locked loop to shift the phase. This allows a rapid return of the horizontal synchronization pulses in the observation window from the next video line onwards, for example.

The subject of the invention is also directed to a device for synchronizing a reference signal with respect to a video signal. The device preferably comprises detection means for detecting successive horizontal synchronization pulses of the video signal, and a phase-locked loop comprising a controllable oscillator delivering the reference signal. A phase comparator performs a phase comparison between the successive detected pulses and the successive transitions of the reference signal for controlling the oscillator.

According to a general characteristic of the invention, the detection means comprise means for sampling the video signal, a low-pass filter connected to the sampling means, and thresholding means connected to the filter for leaving only pulses whose level is below a threshold. Selection means perform a selection that is a function of predetermined selection criteria from among the residual pulses situated inside an observation window centered on each transition of the reference signal. That is, the one which corresponds to the horizontal synchronization pulse.

When the selection criteria comprises dimension criteria with respect to a mean dimension of a horizontal synchronization pulse, the selection means comprise first decision means for eliminating all the residual pulses having a width below a predetermined percentage of the mean width of a horizontal synchronization pulse. The first decision means are thus preferably able to select the residual pulse whose width most closely approximates the mean width.

When the selection criteria comprises position criteria with respect to the expected position of the horizontal synchronization pulse, the selection means comprise determination means for determining the time gap between each residual pulse and the transition of the reference signal, and second decision means for selecting the one having the smallest time gap.

According to one embodiment of the invention, when the selection criteria is criteria which combines the position criteria and the dimension criteria, the selection means comprise first decision means for eliminating all the residual pulses whose width is below a predetermined percentage of the mean width of a horizontal synchronization pulse, and to assign each non-eliminated residual pulse a first score as a function of its width. The highest first score corresponds to a pulse whose width is equal to the mean width.

Moreover, with the expected position of the horizontal synchronization pulse being that of the transition of the reference signal, the selection means comprise determination means for determining the time gap between each non-eliminated residual pulse and the transition of the reference signal, and second decision means for assigning a second score to each non-eliminated residual pulse. The highest second score corresponds to a pulse having a zero time gap. The selection means thus comprise weighting means for assigning each non-eliminated residual pulse a final score resulting from a predetermined weighting between the first score and the second score. The selection means may also comprise decision and final means for selecting the residual pulse enjoying the highest final score.

According to one embodiment of the invention, the detection means also comprise additional selection means for detecting as a function of the predetermined selection criteria, from among the residual pulses situated outside the observation window, the one which corresponds to a horizontal synchronization pulse. The detection means also includes initialization means for initializing, if the detection is positive, at the start of the observation window the phase error controlling the oscillator to a very high value. If no pulse is selected during the observation window, then this very large phase error will lead to a very large phase shift of the phase-locked loop.

BRIEF DESCRIPTION OF THE DRAWINGS

Other advantages and characteristics of the invention will become apparent on examining the detailed description of the embodiment and mode of implementation, which are in no way limiting, and of the appended drawings in which.

DETAILED DESCRIPTION OF THE PREFERRED EMBODIMENTS

Figure 1:
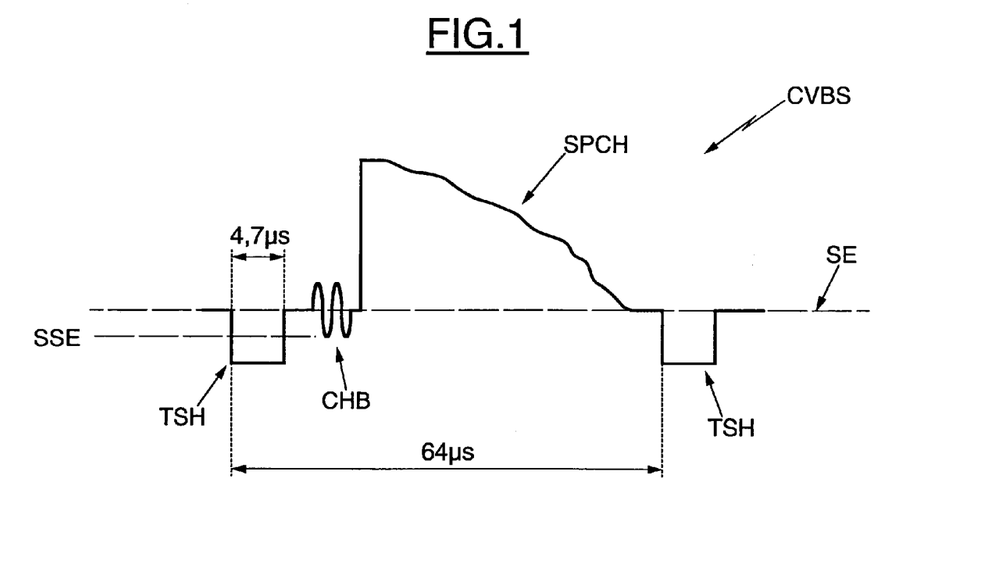
FIG. 1 diagrammatically illustrates a video signal according to the invention.

FIG. 1 represents a part of an analog video signal CVBS corresponding to a video line. This signal part, which extends over 64 microseconds, for example, starts with a horizontal synchronization pulse TSH. This pulse TSH extends over 4.7 microseconds, for example, and has a level which is below a predetermined threshold SE, for example, corresponding to the black level. The pulse TSH is followed by a reference burst CHB which serves as a phase reference for the decoding of the chrominance of the remainder of the video line SPCH (active video line).

Figure 2:
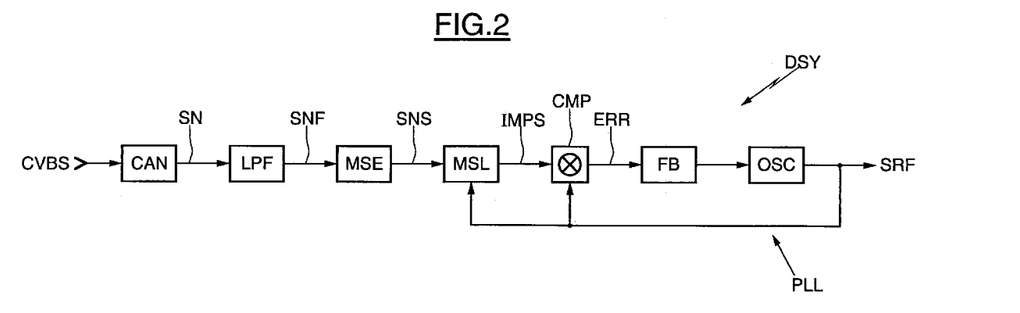
FIG. 2 diagrammatically illustrates an embodiment of a synchronization device according to the invention.

In FIG. 2, the reference DSY designates a synchronization device according to the invention. This device comprises at the frontend an analog digital converter receiving the analog signal CVBS and delivering a sampled digital signal SN. The sampling frequency is, for example, on the order of 27 MHz corresponding to a sampling clock whose rising edges are spaced 37 nanoseconds apart.

The analog digital converter CAN is followed by a low-pass filter LPF. The cutoff frequency of this low-pass filter is typically between 200 kHz and 2 MHz, and preferably between 500 kHz and 1 MHz. Such a filter makes it possible to eliminate a good part of the noise and the chrominance subcarrier.

The filtered sampled signal SNF is then delivered to thresholding means MSE. The latter performs a thresholding of the signal for eliminating any part of the signal SNF whose level is above a threshold SEE (FIG. 1). This threshold is, for example, on the order of 50% of the measured mean amplitude of a horizontal synchronization pulse. The thresheld digital signal SNS consequently comprises residual pulses which are regarded as being potential horizontal synchronization pulses.

Selection means MSL will then select, as will be seen in greater detail below, a pulse IMPS which will be regarded as being the horizontal synchronization pulse. This pulse IMPS will then be delivered to a conventional phase-locked loop PLL comprising a phase comparator CMP followed by a loop filter FB. The loop filter FB may be of the proportional integral type, for example, and is followed by a controllable oscillator OSC delivering a reference signal SRF.

As is conventional, the reference signal SRF is in fact the output signal from the synchronization device which will be synchronized with the video signal. Stated otherwise, after synchronization and in the steady state, the transitions of the reference signal SRF correspond to the horizontal synchronization pulses contained in the video signal. The reference signal SRF is moreover fed back to the phase comparator CMP, and as will be seen in greater detail below, also to the selection means MSL so as to allow selection according to a predetermined criteria.

The oscillator is controlled, via the loop filter FB, by an error signal ERR representative of the phase gap between the selected pulse IMPS and a transition of the reference signal SRF. In the example described herein, the oscillator is a cyclic counter incremented in synch with the sampling clock signal, and whose nominal final count value is equal to 1727, for example. This corresponds to a video line length of 64 microseconds. Furthermore, the final count value of this cyclic counter can vary by plus or minus 300, for example, around the nominal value so as to be able to allow synchronization with the video signal. Of course, this variation can be greater or less.

Figure 3:
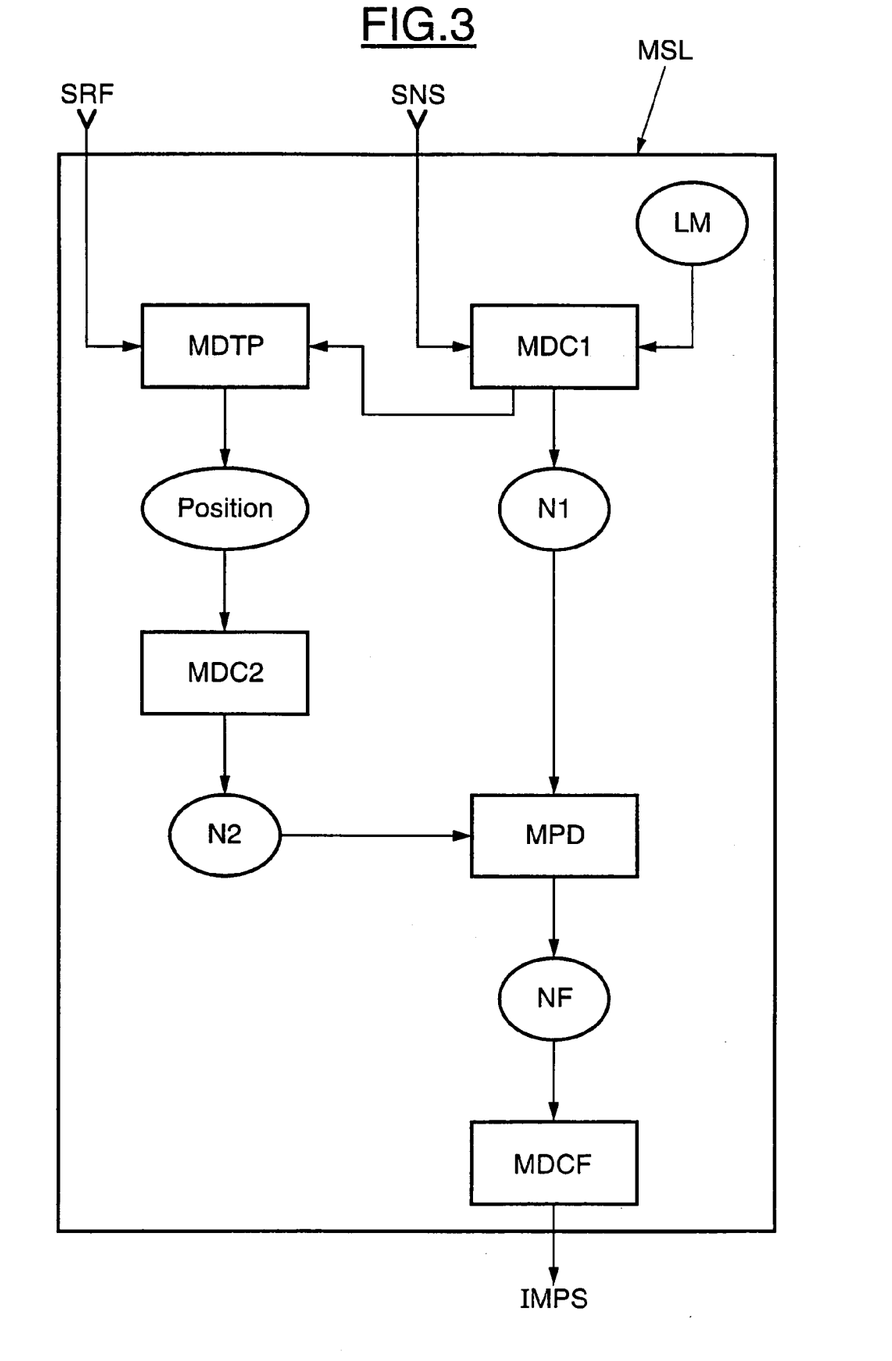
FIG. 3 illustrates in greater detail the detection means illustrated in FIG. 2.

An embodiment of the selection means MSL which will implement a combined position and dimension criteria will now be described in greater detail while referring more specially to FIG. 3. More precisely, the selection means MSL comprise first decision means MDC1 for eliminating all the residual pulses of the signal SNS whose width is below a predetermined percentage of the mean width LM of a horizontal synchronization pulse. This predetermined percentage is equal to 40%, for example. Stated otherwise, all the overly narrow residual pulses are eliminated.

Each non-eliminated residual pulse is then assigned a first score N1 as a function of its width. The highest first score corresponds to a pulse whose width is equal to the mean width LM. On the basis of this highest score it is possible to apply, for example, a decreasing linear function in order to define each score as a function of the detected width of the residual pulse. Nonetheless, other mathematical functions are conceivable, such as a power function or an exponential function, for example.

Moreover, the selection means comprise determination means MDTP for determining the time gap between each non-eliminated residual pulse and a transition of the reference signal SRF. This transition occurs each time the cyclic counter forming the oscillator OSC reaches its current final count value. Second decision means MDC2 will then assign a second score N2 to each non-eliminated residual pulse. This highest second score N2 corresponds to a pulse having a zero time gap. Here again, a linear relation is used to define the other scores, for example.

The selection means then comprise weighting means MPD for assigning each non-eliminated residual pulse a final score NF resulting from a predetermined weighting between the first score N1 and the second score N2. Final detection means MDCF will then select the residual pulse with the highest final score.

The characteristics of the selected pulse IMPS, and in particular its time gap with respect to the transition of the reference signal, will make it possible to determine the phase error ERR (FIG. 2) in such a way as to be able to control the oscillator OSC, possibly by modifying its current final count value. This selection may be performed in the course of an observation window FOB (FIG. 4) centered on each transition TRi of the reference signal SRF.

Figure 4:
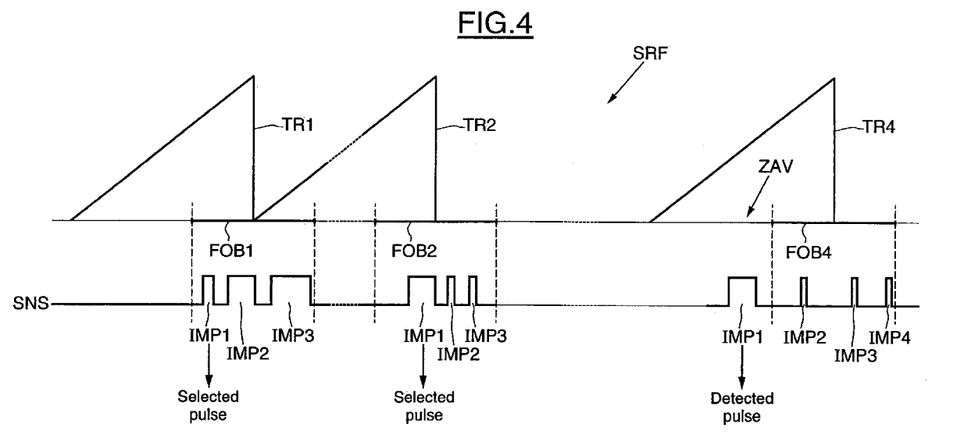
FIG. 4 diagrammatically illustrates a mode of implementation of the process according to the invention.

For example, three transitions TR1, TR2 and TR4 of the reference signal SRF have been represented in FIG. 4. Each observation window, which has a length equal to around $\frac{2}{3}$ of a video line, is centered on the corresponding transition of the reference signal SRF.

Thus, in the course of the observation window FOB1, the thresheld signal SNS exhibits three potential horizontal synchronization pulses IMP1, IMP2 and IMP3. Among these three pulses, the pulse IMP1 is regarded as being too narrow while the pulse IMP3 is regarded as both too wide and further from the transition TR1 than the pulse IMP2. Moreover, this pulse IMP2 exhibits a width which most closely approximates the width LM.

Consequently, it will be assumed here that it is the pulse IMP2 which is selected. On the basis of this selection, the phase error between the pulse IMP2 and the transition TR1 is calculated, and this will make it possible to define in the next cycle the occurrence of the transition TR2.

The observation window FOB2 is then centered on the transition TR2. This time, it is the pulse IMP1 which is selected as being the horizontal synchronization pulse. By centering the observation window on each transition it is possible to ensure that a selected pulse belongs to the correct video line and not to an adjacent video line.

Although the length of the observation window is chosen to be sufficiently large, it is possible in certain cases that the horizontal synchronization pulse may lie outside this observation window in a so-called blind zone ZAV, as is the case for the pulse IMP1 illustrated in the right-hand part of FIG. 4.

To remedy this problem, provision is then made for the detection means to comprise additional selection means which will detect, as a function of the predetermined selection criteria, from among the residual pulses situated outside the observation window (situated in the blind zone ZAV) for the one which corresponds to a horizontal synchronization pulse.

In the present case, just the width of the pulses will be used as selection criteria. The additional selection means are then formed simply by the first decision means MDC1. In the case where the first decision means MDC1 detects a probable horizontal synchronization pulse in the blind zone ZAV, initialization means will then initialize, at the start of their observation window FOB4, the phase error to a very high value. Thus, if no pulse is selected in the course of the observation window, as is the case for the pulses IMP2, IMP3 and IMP4 which are regarded as being too narrow, this very large phase error will lead to a very large phase shifting of the phase-locked loop. This allows a rapid return of the horizontal synchronization pulses in the succeeding observation windows.

In terms of hardware, the various means forming the selection means may be embodied in the form of hard-wired logic, or else via software within a microcontroller. Moreover, the device according to the invention can be embodied in the form of an integrated circuit within a silicon wafer, for example.

The invention claimed is:

1. A process for synchronizing a reference signal with a video signal, with the reference signal from an oscillator of a phase-locked loop, the process comprising;
   detecting successive horizontal synchronization pulses of the video signal, the detection of each horizontal synchronization pulse comprising
      sampling the video signal,
      low-pass filtering the sampled signal,
      thresholding the filtered sampled signal for leaving pulses having a level below a threshold, and
      selecting a residual pulse corresponding to a detected horizontal synchronization pulse as a function of selection criteria and from among residual pulses inside an observation window based upon a transition of the reference signal; and
   comparing a phase between the detected successive horizontal synchronization pulses and successive transitions of the reference signal for controlling the oscillator.

2. A process according to claim 1, wherein the selection criteria comprises position criteria with respect to an expected position of the horizontal synchronization pulse.

3. A process according to claim 2, wherein the expected position of the horizontal synchronization pulse is the same as the transition of the reference signal; and further comprising:
   determining a time gap between each residual pulse and the transition of the reference signal; and
   selecting the residual pulse having the smallest time gap.

4. A process according to claim 1, wherein the selection criteria comprises dimension criteria with respect to a mean dimension of the horizontal synchronization pulse.

5. A process according to claim 5, wherein the mean dimension of the horizontal synchronization pulse comprises a mean width thereof; and further comprising eliminating the residual pulses having a width below a predetermined percentage of the mean width.

6. A process according to claim 5, further comprising selecting the residual pulses having a width that most closely approximates the mean width.

7. A process according to claim 1, wherein the selection criteria comprises position criteria with respect to an expected position of the horizontal synchronization pulse, and dimension criteria with respect to a mean dimension of the horizontal synchronisation pulse.

8. A process according to claim 7, further comprising:
   eliminating the residual pulses having a width below a predetermined percentage of a mean width of a horizontal synchronization pulse;
   assigning a first score to each non-eliminated residual pulse as a function of its width, with a highest first score corresponding to a residual pulse having a width equal to the mean width of the horizontal synchronization pulse, and the expected position of the horizontal synchronization pulse is the same as the transition of the reference signal,
   determining a time gap between each non-eliminated residual pulse and the transition of the reference signal;
   assigning a second score to each non-eliminated residual pulse, with a highest second score corresponding to a residual pulse having a zero time gap;
   assigning a final score to each non-eliminated residual pulse based upon a weighting between the first score and the second score; and
   selecting the residual pulse having a highest final score.

9. A process according to claim 1, wherein a length of the observation window is about 0.66 times a length of a video line.

10. A process according to claim 1, wherein a length of the observation window varies.

11. A process according to claim 1, wherein detecting the successive horizontal synchronization pulses further comprises detecting, as a function of the selection criteria and from among the residual pulses outside the observation window, the residual pulse corresponding to the horizontal synchronization pulse, and if this detection is positive, then initializing at a start of the observation window for providing a value to a phase error that controls the oscillator.

12. A device for synchronizing a reference signal with a video signal, the device comprising:
   detection means for detecting successive horizontal synchronization pulses of the video signal, said detection means comprising
      sampling means for sampling the video signal,
      filtering means connected to said sampling means for filtering the sampled signal,
      thresholding means connected to said filtering means for leaving pulses in the filtered sampled signal having a level below a threshold, and selection means for selecting a residual pulse corresponding to a detected horizontal synchronization pulse as a function of selection criteria and from among residual pulses inside an observation window based upon each transition of the reference signal;
   a phase-locked loop comprising a controllable oscillator providing the reference signal; and
   a phase comparator connected to said detection means and to said phase-locked loop for comparing a phase between the detected successive horizontal synchronization pulses and successive transitions of the reference signal for controlling said oscillator.

13. A device according to claim 12, wherein the selection criteria comprises dimension criteria with respect to a mean dimension of the horizontal synchronization pulse.

14. A device according to claim 13, wherein the mean dimension of the horizontal synchronization pulse comprises a mean width thereof; and wherein said selection means comprises first decision means for eliminating the residual pulses having a width below a predetermined percentage of the mean width of the horizontal synchronization pulse.

15. A device according to claim 14, wherein said first decision means selects the residual pulse having a width that most closely approximates the mean width of the horizontal synchronization pulse.

16. A device according to claim 12, wherein the selection criteria comprises position criteria with respect to an expected position of the horizontal synchronization pulse.

17. A device according to claim 16, wherein the expected position of the horizontal synchronization pulse is the same as the transition of the reference signal; and wherein said selection means comprises;
   determination means for determining a time gap between each residual pulse and the transition of the reference signal; and
   second decision means for selecting the residual pulse having the smallest time gap.

18. A device according to claim 12, wherein the selection criteria comprises position criteria with respect to an expected position of the horizontal synchronization pulse, and dimension criteria with respect to a mean dimension of the horizontal synchronization pulse.

19. A device according to claim 18, wherein said selection means comprises:
   first decision means for
      eliminating the residual pulses having a width below a predetermined percentage of a mean width of a horizontal synchronization pulse, and
      assigning a first score to each non-eliminated residual pulse as a function of its width, with a highest first score corresponding to a residual pulse having a width equal to the mean width of the horizontal synchronization pulse, and the expected position of the horizontal synchronization pulse is the same as the transition of the reference signal;
   determination means for determining a time gap between each non-eliminated residual pulse and the transition of the reference signal;
   second decision means for assigning a second score to each non-eliminated residual pulse, with a highest second score corresponding to a residual pulse having a zero time gap; and
   weighting means for assigning to each non-eliminated residual pulse a final score resulting from a weighting between the first score and the second score; and
   final decision means for selecting the residual pulse having a highest final score.

20. A device according to claim 12, wherein a length of the observation window is about 0.66 times a length of a video line.

21. A device according to claim 12, wherein a length of the observation window varies.

22. A device according to claim 12, wherein said detection means further comprises:
   additional selection means for detecting, as a function of the selection criteria and from among the residual pulses outside the observation window, the residual pulse corresponding to the horizontal synchronization pulse; and
   initialization means, based upon a positive detection of said additional selection means, for initializing at a start of the observation window a value for a phase error that controls said oscillator.

23. A device according to claim 12, wherein the device is configured as an integrated circuit.

24. A device for synchronizing a reference signal with a video signal, the device comprising;
   a detector for detecting successive horizontal synchronization pulses of the video signal, said detector comprising
      an analog-to-digital converter for converting the video signal into a sampled digital signal,
      a filter connected to said analog-to-digital converter for filtering the sampled digital signal,
      a threshold circuit connected to said filter for leaving pulses in the filtered sampled digital signal having a level below a threshold, and
      a selection circuit for selecting a residual pulse corresponding to a detected horizontal synchronization pulse as a function of selection criteria and from among residual pulses inside an observation window based upon each transition of the reference signal;
   a phase-locked loop comprising a controllable oscillator providing the reference signal; and
   a phase comparator connected to said detector and to said phase-locked loop for comparing a phase between the detected successive horizontal synchronization pulses and successive transitions of the reference signal for controlling said oscillator.

25. A device according to claim 24, wherein the selection criteria comprises dimension criteria with respect to a mean dimension of the horizontal synchronization pulse.

26. A device according to claim 25, wherein the mean dimension of the horizontal synchronization pulse comprises a mean width thereof; and wherein said selection circuit comprises a first decision module for eliminating the residual pulses having a width below a predetermined percentage of the mean width of the horizontal synchronization pulse.

27. A device according to claim 26, wherein said first decision module selects the residual pulse having a width that most closely approximates the mean width of the horizontal synchronization pulse.

28. A device according to claim 24, wherein the selection criteria comprises position criteria with respect to an expected position of the horizontal synchronization pulse.

29. A device according to claim 28, wherein the expected position of the horizontal synchronization pulse is the same as the transition of the reference signal; and wherein said selection circuit comprises:
   a determination module for determining a time gap between each residual pulse and the transition of the reference signal; and
   a second decision module for selecting the residual pulse having the smallest time gap.

30. A device according to claim 24, wherein the selection criteria comprises position criteria with respect to an expected position of the horizontal synchronization pulse, and dimension criteria with respect to a mean dimension of the horizontal synchronization pulse.

31. A device according to claim 30, wherein said selection circuit comprises:
   a first decision module for
      eliminating the residual pulses having a width below a predetermined percentage of a mean width of a horizontal synchronization pulse, and
      assigning a first score to each non-eliminated residual pulse as a function of its width, with a highest first score corresponding to a residual pulse having a width equal to the mean width of a horizontal synchronization pulse, and the expected position of the horizontal synchronization pulse is the same as the transition of the reference signal;
a determination module for determining a time gap between each non-eliminated residual pulse and the transition of the reference signal;
a second decision module for assigning a second score to each non-eliminated residual pulse, with a highest second score corresponding to a residual pulse having a zero time gap; and
a weighting module for assigning to each non-eliminated residual pulse a final score resulting from a weighting between the first score and the second score; and
a final decision module for selecting the residual pulse having a highest final score.

32. A device according to claim 24, wherein a length of the observation window is about 0.66 times a length of a video line.

33. A device according to claim 24, wherein a length of the observation window varies.

34. A device according to claim 24, wherein said detector further detects, as a function of the selection criteria and from among the residual pulses outside the observation window, the residual pulse corresponding to the horizontal synchronization pulse; and based upon a positive detection, initializes at a start of the observation window a value for a phase error that controls said oscillator.

* * * * *

UNITED STATES PATENT AND TRADEMARK OFFICE
CERTIFICATE OF CORRECTION

PATENT NO. : 7,050,111 B2  Page 1 of 1
APPLICATION NO. : 10/280737
DATED : May 23, 2006
INVENTOR(S) : Diego Coste It is certified that error appears in the above-identified patent and that said Letters Patent is hereby corrected as shown below:

Title page item 30    Insert: -- Foreign Application Priority Data
                              FR 0113905        10/26/2005 --

Column 5, Line 24    Delete: "thresheld"
                     Insert: -- threshold --

Column 6, Line 40    Delete: "thresheld"
                     Insert: -- threshold --

Column 7, Line 27    Delete: " ; "
                     Insert: -- : --

Column 7, Line 57    Delete: "5,"
                     Insert: -- 4, --

Column 8, Line 2     Delete: "synchronisation"
                     Insert: -- synchronization --

Column 9, Line 14    Delete: " ; "
                     Insert: -- : --

Column 10, Line 2    Delete: " ; "
                     Insert: -- : --

Signed and Sealed this

Sixteenth Day of January, 2007

JON W. DUDAS
*Director of the United States Patent and Trademark Office*